C. PAULI.
TROLLEY.
APPLICATION FILED DEC. 4, 1909.
963,387.
Patented July 5, 1910.
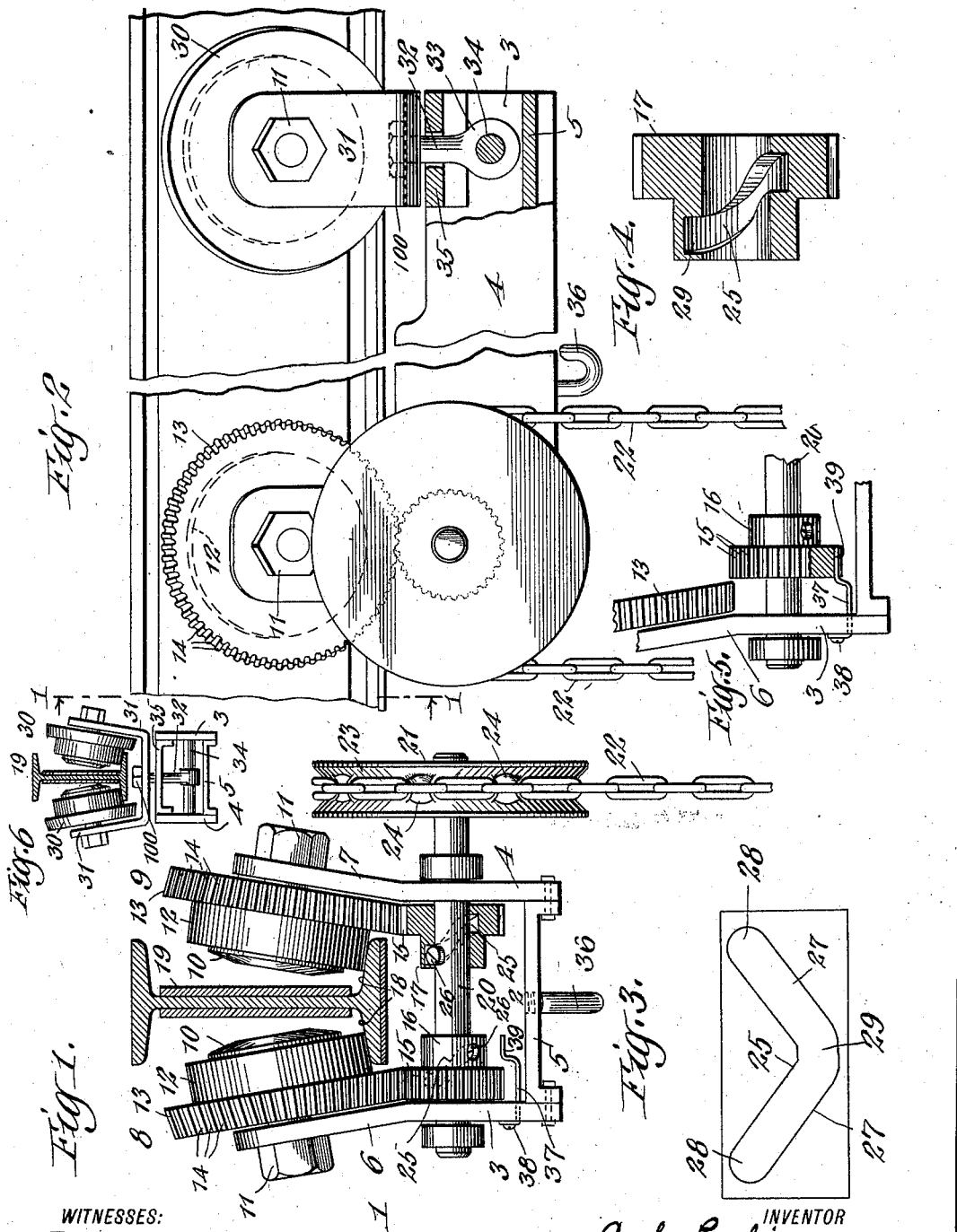
WITNESSES:
INVENTOR
Carl Pauli
BY
Alan M. Johnson
ATTORNEY

UNITED STATES PATENT OFFICE.

CARL PAULI, OF ROSELLE PARK, NEW JERSEY, ASSIGNOR TO NEW JERSEY FOUNDRY AND MACHINE COMPANY, A CORPORATION OF NEW JERSEY.

TROLLEY.

963,387. Specification of Letters Patent. Patented July 5, 1910.

Application filed December 4, 1909. Serial No. 531,415.

*To all whom it may concern:*

Be it known that I, CARL PAULI, a citizen of no country, and a resident of Roselle Park, in the county of Union, in the State of New Jersey, have invented certain new and useful Improvements in Trolleys, of which the following is a specification, taken in connection with the accompanying drawing, which forms a part of the same.

This invention relates to trolleys and more particularly to trolleys which can be converted or changed from a non-geared trolley to a geared trolley, or the reverse, as it is desired to transport heavy or light loads by means of its aid. By the term "trolley" I mean any carriage which moves along an elevated rail, or rails for the transportation of heavy or light loads; it of course being understood that the two flanges upon which the traction wheels operate is in effect two rails or traction surfaces.

In the accompanying drawing I have shown, simply for purposes of illustration, one illustrative embodiment of this invention in which the same reference numerals refer to similar parts in the several figures.

Figure 1 is a transverse vertical section on substantially the line 1—1 of Fig. 2, parts of the mechanism being shown in side elevation and one of the pinions being broken away for purposes of better illustration; Fig. 2 is a side elevation of the trolley and a track a portion of the trolley being broken away for purposes of illustration; Fig. 3 is a plan view of the development of the cam slot with which the interior of the pinions are provided; Fig. 4 is a vertical section through one of the pinions showing a portion of the cam slot; Fig. 5 is a fragmentary view showing a detail of construction; Fig. 6 is a transverse vertical sectional view through the track and an end view of the trolley on a smaller scale showing a swivel connection between the carriage and the first set of wheels of the trolley.

In the illustrative embodiment of this invention shown in the drawing, 1 is a trolley which may be formed in various ways and of various material. For purposes of illustration I have shown it consisting of a carriage 2 formed of substantially two side plates 3 and 4 connected together by any suitable means such as by a strut 5. The upper end of each of the side plates 3 and 4 is provided in any suitable manner with upwardly extending ears 6 and 7, respectively, which may be formed integral with the ends of the side plates 3 and 4 or secured to them in any suitable manner and are preferably, though not necessarily, mounted at a slight angle to their respective side plates.

In the upper end of each of the ears 6 and 7 I mount gear traction wheels 8 and 9 by means of the headed bolts, 10, 10 and nuts 11, 11. Each of these traction wheels 8 and 9 has two peripheries 12 and 13; the former being preferably of the smaller diameter and formed smooth, while the latter is preferably of the greater diameter and is provided with gear teeth 14, 14 to mesh with the teeth 15, 15 on the pinions 16 and 17, respectively. In the construction shown for purposes of illustration I mount the plain or smooth portion 12, 12 of the traction wheels 8 and 9 to engage the flange 18 of an I-beam 19 which serves as a track, though it is to be understood, of course, that any other suitable form of track may be used.

Extending through and preferably adjacent to the ends of the side plates 3 and 4 I mount an axle 20 having a hand or chain wheel 21. Preferably, though not necessarily, this wheel is mounted at such an elevation that it is desirable to operate it through some other instrumentality such as a rope or chain 22. This wheel may be given any suitable contour but preferably it is formed with a concave periphery for the reception of the chain or other operating means, the bottom of the groove 23 of the chain wheel being preferably provided with lugs 24 to coöperate with the different links of the chain 22 to prevent slipping or lost motion of the chain in the groove 23.

Each of the pinions 16 and 17 is loosely mounted upon the axle 20 and capable of a relative limited rotation with relation to it, to permit the pinions 16 and 17 (or one of them if only one be used) to be engaged and disconnected from the gear teeth 14, 14 upon the wheels 8 and 9, respectively, so as to permit these wheels to run free without engaging with the teeth 15, 15 of the pinions. While I have found from experience that it is better to apply the traction to two of the wheels of the carriage such as 8 and 9, it is, of course, to be understood that if desired power may be transmitted to only one of such wheels in which case one of the pinions 16 or 17 could be omitted without departing from my invention; preferably, however, I use two such pinions, though my invention will operate, as noted, with merely one. These pinions 16 and 17 may be mounted on the axle 20 in various ways provided they will permit the axle 20 through the pinions to be engaged and disengaged with the gear teeth 14, 14 of the wheels 8 and 9. Simply for purposes of illustration, but to which my invention is not to be limited, I show these pinions thrown into and out of engagement with the gear teeth 14, 14 of the wheels 8 and 9, respectively, by means of cam slots 25 and pins 26, 26, the cam slots being cast, machined, or otherwise formed in the separate pinions 16 and 17 and the pins 26, 26 being secured in any suitable manner in or to the axle 20, though of course this arrangement may be reversed if desired, the same function being accomplished.

The cam grooves 25 are preferably formed of two separate portions 27, 27 as more fully shown in the development of the cam in Fig. 3. The arrangement is such that when the pins 26, 26 are at either end 28, 28 of the arms 27, 27 of the cam grooves 25, 25, the pinions will be in engagement with the teeth of the coöperating gear wheel 8 or 9 as the case may be. With the gear wheels in this position it will be apparent that by rotating the axle 20 by means of the chain 22 and chain wheel 21 a portion of a revolution in a direction opposite to that in which it was last traveling, the pin 26 will be caused to travel from either end 28 toward the junction 29 of the arms 27, 27 (Fig. 3) which will cause, in an obvious manner, the pinion to slide toward the center of the carriage and out of engagement with its respective wheel 8 or 9, as the case may be, permitting its coöperating gear wheel to travel free from engagement with the teeth 15 upon the pinion. The pinion can then be engaged with its respective gear wheel by reversing the partial rotation of the axle 20. While I have described merely the operation of one of the pinions, this description applies also to the other pinion, if two should be used, though as previously noted my invention will operate with merely one pinion. When two of them are used as shown in the illustration they move simultaneously into and out of engagement by rotating the axle 20.

In cases where the track is circuitous my invention prevents the outside wheel 12 from sliding along on the track due to the fact that it has a greater distance to travel than the wheel on the inside of the curve. This objection in trolleys and the consequent intermittent friction on the track is prevented in my device for the wheel traveling on the outside of the curve will rotate its pinion at a slightly higher rate of speed than the axle 20 is traveling. This will cause that pinion with its cam groove 25 to slide on its pin 26, until the teeth 15 of that pinion have momentarily become disengaged from the teeth 14 which will permit one or more teeth on the gear wheel to slip to compensate for the additional travel of the outside wheel. When the two wheels 8 and 9 are again traveling at the same speed the pinion which had been momentarily disengaged will be automatically thrown back into its engagement with its respective gear wheel. This act of the pinion may be confined either to one of them or the pinions may be successively thrown in or out of engagement depending upon the form of curve track over which the trolley is traveling.

My trolley may comprise simply the pair of traction wheels such as shown in Fig. 1 but preferably, though not necessarily, I provide the carriage with another set of traction wheels 30 mounted in a yoke 31 swivelly connected with an I-bolt 32 held to the yoke 31 by means of a nut 100. Through the eye 33 of this bolt I pass a rod or strut 34 securing it to the sides 3 and 4 of the carriage, which is also preferably further braced by means of the strut 5 which preferably extends to the front of the carriage. An additional strut 35, Fig. 6, may also in some cases be used. By arranging the traction wheels 30, 30 so that they have swivel connection with the carriage it will be readily seen that the trolley has great flexibility and can negotiate very sharp curves in the track.

The carriage may be provided in any suitable manner, with mechanism for the suspension or the lifting of the article to be transported. This mechanism, however, is no part of this invention. For purposes of illustration I have shown a ring 36 connected to the carriage to which any suitable suspension or lifting mechanism may be attached (not shown).

My convertible trolley has proved in practice to be of great value. It combines the advantages of a geared trolley with all the advantages of a plain trolley and with no disadvantage of either. If it is desired to move the trolley over to a light load, it is not necessary to take the time and effort of working it over by means of pulling on the chain 22 until the pinions 16 and 17 have moved the carriage over to the object to be transported. On the contrary by giving a partial revolution to the axle 20 by means of the chain 22 the pinions 16 and 17 are caused to move toward each other and out of engagement with the gear teeth 14, 14 of the wheels 8 and 9. The entire trolley can then be quickly moved along the track by merely pulling or dragging simultaneously upon the two ends of the chain 22, the trolley then acting simply as a plain or non-geared trolley. If the object to be transported is relatively light and does not create sufficient friction upon the track 18 to resist easy movement of the trolley, the ends of the chain 22 are retained in the same position as last described which will hold the pinions 16 and 17 out of mesh with the gear teeth 14, 14 so that the trolley can be further moved, or pulled, now with the addition of the light load, to the position where said load is to be deposited. This operation of the trolley as an ungeared trolley may continue until such time as an object to be transported is relatively heavy in which case the pinions are still retained out of gear with the geared teeth 14, 14, until the trolley is located over or adjacent to the object to be lifted or carried. With such a heavy object and one which creates considerable friction upon the track, the ends of the chains 22 are moved with relation to each other sufficiently to give a partial rotation to the chain wheel 21 which being transmitted to the axle 20 will cause a relative rotation between the pins 26, 26 and the cam grooves 25, 25 in which they are located, so as to throw the pinions 16 and 17 outward and into mesh with their respective gear wheels 8 and 9. The trolley has now been converted into a geared trolley and the traction wheels 12, 12 are operated by pulling upon the chain 22 so as to rotate the axle 20 and pinions 16 and 17 through the teeth 14 and 15. While operating as a geared trolley, it is ready at any moment upon the depositing of the relatively heavy load, to be again changed to a non-geared trolley, permitting a quick trip to the next load and, if the load be a light one, the trolley will be continued as a non-geared trolley to permit the light load to be quickly transported. If the next load proves to be a heavy one the trolley is moved along the track by means of the gears.

In some cases, though not necessarily, I have found it expedient to apply friction to one or both of the pinions when they are out of engagement with their gear wheels 8 and 9 so as to prevent an accidental re-engagement of the pinion with its gear wheel. One form of such device but to which my invention is not to be limited, is illustrated in Figs. 1 and 5 in which I secure a piece of preferably spring metal 37 by means of a screw or other fastening device 38 to the side plate 3 having the end 39 of the plate bent into a position where it will engage between teeth 15, 15 on the pinion when the latter has been thrown over into its inoperative position such as shown in Fig. 5. This holds the pinion from relative movement on the axle 20 until such time as it is desired to give a positive relative movement between the pinion and the axle which will cause the pinion with its teeth to engage with the teeth 14 of the gear wheel and at the same time become disengaged from the arm 39 of the retarding device 37.

Having thus described this invention in connection with an illustrative embodiment thereof to the details of which I do not desire to be limited, what is claimed as new and what it is desired to secure by Letters Patent is set forth in the appended claims.

1. The combination with a trolley of one or more wheels carried by the trolley, means to drive the trolley, and automatic means to connect or disconnect said driving means to or from the wheel or wheels of the trolley permitting it to operate as a plain or geared trolley.

2. In a trolley the combination of one or more wheels, a driving axle, an automatic means to directly connect or disconnect said wheel or wheels with or from said axle to permit the trolley to operate either as a power or a non-power driven trolley.

3. In a trolley the combination of one or more wheels to coöperate with a track, an axle to positively drive said wheel or wheels, and automatic means mounted on the axle to connect or disconnect said driving axle to or from the wheel or wheels to permit the trolley to operate either as a power or non-power driven trolley.

4. A trolley comprising the combination of a pair of wheels adapted to coöperate with any suitable track, a driven member, a driving member, positive driving means between the driving and driven members adapted to positively drive said members, and means for automatically and positively disconnecting said driving member from said driven member to permit the trolley to operate either as a power or a non-power driven trolley.

5. In a trolley the combination of a pair of wheels adapted to coöperate with a track, one or more driven members connected one to each wheel, a driving member, one or more pinions loosely mounted upon the driving member and adapted to coöperate with the driven member or members, and means between the pinion or pinions and the driving member to connect and disconnect the pinion or pinions from the driven members to permit the trolley to operate either as a power or a non-power driven trolley.

6. In a trolley the combination of a pair of wheels adapted to coöperate with a track, one or more gear wheels connected one to each wheel, a driving member, one or more pinions provided with cam slots, one or more pins carried by the driving member, one pin for each cam slot to permit the trolley to operate as a geared or a non-geared trolley.

7. In a trolley the combination of a pair of wheels adapted to coöperate with a track, a driving member, one or more pinions loosely mounted upon the driving member and adapted to coöperate with the wheels, means between the pinion and the driving member to connect and disconnect the pinion or pinions from the wheels to permit the trolley to operate either as a geared or a non-geared trolley, and a retarding member to hold the pinion in its inoperative position and to prevent its accidental operation.

8. In a trolley the combination of a pair of wheels adapted to coöperate with a track, a driving member, one or more pinions provided with cam slots, one or more pins carried by the driving member one for each cam slot, permitting the trolley to operate as a geared or a non-geared trolley, and a member adapted to engage with the teeth of the pinion and to prevent its accidental operation while in its inoperative position.

9. In a trolley the combination of a carriage, a pair of gear traction wheels, a pair of non-geared traction wheels, a driving axle, pinions loosely mounted upon the axle and adapted to have a relative movement with relation to the same, and means between the pinions and the axle permitting the pinions to be engaged with and disengaged from the gear wheels.

10. In a trolley the combination of a carriage, a pair of gear traction wheels, a pair of non-geared traction wheels, means to swivelly mount said non-geared traction wheels on the carriage, a driving axle, pinions loosely mounted upon the axle and adapted to have a relative movement with relation to the same, and means between the pinions and the axle permitting the pinions to be engaged with and disengaged from the geared wheels.

11. In a trolley the combination of a pair of wheels adapted to coöperate with the track, one or more friction members connected one to each wheel, a driving member, one or more driven elements loosely mounted upon the driving member and adapted to coöperate with the friction member or members, and means between the loosely mounted driven member or members and the driving member to connect and disconnect the loosely mounted driven member or members from the friction members to permit the trolley to operate either as a power or non-power driven trolley.

12. In a trolley the combination of a pair of wheels adapted to coöperate with the track, one or more friction members connected one to each wheel, a driving member, a loosely mounted driven member mounted on the driving member, and coöperating means carried partly by the driven member and partly by the driving member to move the driven member laterally with relation to the driving member to connect or disconnect the driving member with the friction member to permit the trolley to operate as a power or a non-power driven trolley.

13. In a trolley the combination of a wheel adapted to coöperate with a track, a gear member adapted to actuate the wheel, a driving member, a loosely mounted driven member mounted on the driving member and provided with a cam slot, means on the driving member to coöperate with the cam slot in the driven member to permit the trolley to operate either as a geared or non-geared trolley.

14. In a trolley the combination of a wheel adapted to coöperate with a track, a gear member adapted to actuate the wheel, a driving member, a loosely mounted driven member mounted on the driving member and adapted to coöperate with the gear member, a pin and cam-slots one carried by the driven member and the other by the driving member and adapted to coöperate with each other to permit the trolley to operate either as a geared or non-geared trolley.

15. In a trolley the combination of a wheel adapted to coöperate with a track, a gear member adapted to actuate the wheel, a driven member loosely mounted on the driving member and adapted to coöperate with the gear member, a pin and double cam slots one carried by the driven member and the other by the driving member and adapted to coöperate with each other to permit the trolley to operate either as a geared or non-geared trolley.

16. In a trolley the combination of a pair of wheels adapted to coöperate with a track, one or more gear wheels connected one to each wheel, a driving member, one or more pinions provided with double cam slots, one or more pins carried by the driving member, one pin for each double cam slot to permit the trolley to operate as a geared or a non-geared trolley.

CARL PAULI.

Witnesses:
A. M. WILLIAMS,
HENRY B. NEWHALL, Jr.